US011353137B2

(12) United States Patent
Scopesi (10) Patent No.: US 11,353,137 B2
(45) Date of Patent: Jun. 7, 2022

(54) PNEUMATICALLY CONTROLLABLE VALVE ASSEMBLY, TIRE INFLATION SYSTEM, AND METHODS OF OPERATING THE VALVE ASSEMBLY AND THE TIRE INFLATION SYSTEM

(71) Applicant: DANA ITALIA S.R.L., Arco (IT)

(72) Inventor: Marco Scopesi, Rovereto (IT)

(73) Assignee: DANA ITALIA S.R.L., Arco (IT)

( * ) Notice: Subject to any disclaimer, the term of this patent is extended or adjusted under 35 U.S.C. 154(b) by 455 days.

(21) Appl. No.: 16/347,088

(22) PCT Filed: Oct. 26, 2017

(86) PCT No.: PCT/EP2017/077398
§ 371 (c)(1),
(2) Date: May 2, 2019

(87) PCT Pub. No.: WO2018/082995
PCT Pub. Date: May 11, 2018

(65) Prior Publication Data
US 2019/0271407 A1    Sep. 5, 2019

(30) Foreign Application Priority Data

Nov. 4, 2016    (EP) .................................. 16425102

(51) Int. Cl.
*F16K 31/383*    (2006.01)
*F16K 31/122*    (2006.01)
*B60C 23/00*    (2006.01)

(52) U.S. Cl.
CPC ...... *F16K 31/383* (2013.01); *B60C 23/00318* (2020.05); *B60C 23/00354* (2020.05);
(Continued)

(58) Field of Classification Search
CPC ............ B60C 23/003; B60C 23/00354; B60C 23/00318; B60C 23/00363;
(Continued)

(56) References Cited

U.S. PATENT DOCUMENTS 4,735,232 A * 4/1988 Apostoly ............... B60C 23/003
137/225
2013/0068361 A1* 3/2013 Flory .................... B60C 23/003
152/415

(Continued)

FOREIGN PATENT DOCUMENTS

DE            3729327 A1 * 3/1989 ........... B60C 23/003
DE      102012005384        9/2013
(Continued)

OTHER PUBLICATIONS

European Patent Office, International Search Report and Written Opinion in Application No. PCT/EP2017/077398, dated Oct. 26, 2017, 11 pages, Rijswijk, Netherlands.

Primary Examiner — Kip T Kotter
(74) Attorney, Agent, or Firm — McCoy Russell LLP (57) ABSTRACT

A pneumatically controllable valve assembly, in particular for use in a tire inflation system, includes a first fluid port, a second fluid port, and a movable member configured to be moved between an open position and a closed position. When the movable member is in the open position the first fluid port is in fluid communication with the second fluid port. When the movable member is in the closed position the first fluid port is fluidly isolated from the second fluid port. A first pneumatic actuator is in fluid communication with the first fluid port. The first pneumatic actuator is configured to bias the movable member toward the open position. A second pneumatic actuator is configured to bias the movable member toward the closed position. The valve assembly also includes a flow restrictor. The first fluid port is in fluid
(Continued)

communication with the second pneumatic actuator by way of the flow restrictor, at least when the movable member is in the open position.

20 Claims, 3 Drawing Sheets

(52) U.S. Cl.
CPC ...... *F16K 31/1221* (2013.01); *F16K 31/1223* (2013.01); *B60C 23/00363* (2020.05); *B60C 23/00372* (2020.05)

(58) Field of Classification Search
CPC ............. B60C 23/00372; F16K 31/383; F16K 31/1221; F16K 31/1223
See application file for complete search history.

(56) References Cited

U.S. PATENT DOCUMENTS

| | | | |
|---|---|---|---|
| 2014/0224399 A1* | 8/2014 | Mozingo ............... | F16K 15/063 152/417 |
| 2015/0136270 A1* | 5/2015 | Keane ................... | B60C 23/003 141/4 |
| 2017/0211719 A1* | 7/2017 | Blessing ............... | B60C 23/003 |

FOREIGN PATENT DOCUMENTS

| | | | |
|---|---|---|---|
| JP | S5891984 | | 6/1983 |
| KR | 20100090855 A | * | 8/2010 |
| WO | 2015106767 | | 7/2015 |

* cited by examiner

PNEUMATICALLY CONTROLLABLE VALVE ASSEMBLY, TIRE INFLATION SYSTEM, AND METHODS OF OPERATING THE VALVE ASSEMBLY AND THE TIRE INFLATION SYSTEM

BACKGROUND OF THE INVENTION

The present invention relates primarily to a pneumatically controllable valve assembly, in particular to a valve assembly for use in a tire inflation system; to a tire inflation system including the proposed valve assembly; and to methods of operating the proposed valve assembly and tire inflation system. Valve assemblies and tire inflation systems of the presently proposed type may find application in off-highway vehicles, such as trucks, tractors or earth-moving equipment, for example.

Tire inflation systems are becoming crucial for certain vehicles such as, for example, trucks, tractors and earth-moving vehicles. Tire inflation systems are utilized to measure and adjust the tire pressure to provide the vehicle with the versatility to maneuver over differing terrain types and reduce maintenance requirements. For example, the tire pressure of a wheel assembly in fluid communication with the tire inflation system may be lowered to provide additional traction for the vehicle or may be raised to reduce the rolling resistance of the vehicle. Tire inflation systems typically comprise a main fluid line for inflating and for deflating the tire, a wheel valve for controlling the processes of inflating and of deflating the vehicle tire, and a pilot fluid line for selectively opening and closing the wheel valve by applying a pilot pressure or a pilot pressure pulse to the wheel valve.

A component such as a spindle may comprise a first section of the main fluid line and a first section of the pilot fluid line, and a rotating component such as a wheel hub may comprise a second section of the main fluid line and a second section of the pilot fluid line. Usually, rotary joints are utilized in tire inflation systems to enable fluid communication between non-rotating components and rotating components of the system. For example, the first and the second section of the main fluid may be in fluid communication via a first rotary joint, and the first and the second section of the pilot fluid may be in fluid communication via a second rotary joint. The rotary joints usually comprise annular seals mounted on one of the rotating and the non-rotating component and in sliding sealing contact with the other of the rotating and the non-rotating component. However, production and assembly of the rotary joints may be costly. Also, rotary joints may produce friction between rotating and non-rotating components and are typically prone to leakage. Therefore, it would be advantageous if the number or rotary joints in a tire inflation system could be reduced.

Thus, the problem underlying the present invention consists in designing a valve assembly, in particular for use in a tire inflation system, for controlling a fluid flow through a fluid line and configured to be piloted via a pilot pressure applied through the same fluid line.

SUMMARY

This problem and others may be addressed by the valve assembly according to claim 1, and by the tire inflation system and the methods of operation described herein.

Thus, a pneumatically controllable valve assembly is presently proposed, in particular for use in a tire inflation system. The valve assembly comprises:

a first fluid port;
a second fluid port;
a movable member configured to be moved between an open position and a closed position, wherein when the movable member is in the open position the first fluid port is in fluid communication with the second fluid port, and wherein when the movable member is in the closed position the first fluid port is fluidly isolated from the second fluid port;
a first pneumatic actuator in fluid communication with the first fluid port, the first pneumatic actuator configured to bias the movable member toward the open position;
a second pneumatic actuator in fluid communication with the first fluid port, the second pneumatic actuator configured to bias the movable member toward the closed position; and
a flow restrictor;
wherein the first fluid port is in fluid communication with the second pneumatic actuator by way of the flow restrictor, for example at least when the movable member is in the open position.

As will be explained in more detail further below, the movable member may be moved between the open and the closed position simply by varying a fluid pressure applied to the first fluid port. Also, when the movable member is in the open position, fluid may pass through the valve assembly in either direction, i.e. from the first fluid port to the second fluid port or vice versa, without causing the movable member to move to the closed position. Therefore, the proposed valve assembly may be used in a tire inflation system comprising only a single fluid line for inflating and deflating a vehicle tire via the valve assembly, and for piloting the valve assembly. Within the scope of this document the term fluid preferably refers to a gaseous medium such as air.

However, the proposed valve assembly is not limited to applications in tire inflation systems but may be used in any other pneumatic system. As a non-limiting example, the proposed valve assembly may be used for controlling the pneumatics of an assembly robot.

The flow restrictor is preferably configured such that, when the first fluid port is pressurized, a flow of pressurized fluid from the first fluid port to the second pneumatic actuator is restricted relative to a flow of pressurized fluid from the first fluid port to the first pneumatic actuator. Or in other words, the flow restrictor, the first pneumatic actuator and the second pneumatic actuator are preferably configured such that, when the first fluid port is pressurized, an increase in a fluid pressure or an increase in a closing force acting on the second pneumatic actuator and biasing the movable member toward the closed position is delayed relative to an increase in a fluid pressure or relative to an increase in an opening force acting on the first pneumatic actuator and biasing the movable member toward the open position. In this way, the movable member may be moved from the closed position to the open position by pressurizing the first fluid port and/or the first pneumatic actuator.

Similarly, the flow restrictor, the first pneumatic actuator and the second pneumatic actuator are preferably configured such that, when the first fluid port and/or the first pneumatic actuator is vented or de-pressurized, for example by selectively fluidly connecting the first fluid port with the atmosphere or with a low pressure tank, a flow of fluid from the second pneumatic actuator toward the first fluid port and the venting of the second pneumatic actuator via the first fluid port may be restricted relative to a flow of fluid from the first pneumatic actuator toward the first fluid port and the venting of the first pneumatic actuator via the first fluid port. Or in other words, the flow restrictor, the first pneumatic actuator and the second pneumatic actuator are preferably configured such that, when the first fluid port and/or the first pneumatic actuator is vented or de-pressurized, a decrease in a fluid pressure or a decrease in a closing force acting on the second pneumatic actuator and biasing the movable member toward the closed position may be delayed relative to a decrease in a fluid pressure or relative to a decrease in an opening force acting on the first pneumatic actuator and biasing the movable member toward the open position. In this way, the movable member may be moved from the open position to the closed position by venting or de-pressurizing the first fluid port and/or the first pneumatic actuator.

For example, the flow restrictor may comprise an orifice. Additionally or alternatively, the flow restrictor may comprise an air-permeable porous medium disposed in a fluid conduit fluidly connecting the first fluid port with the second pneumatic actuator, the air-permeable porous medium thereby reducing an effective minimum cross section of said fluid conduit. A minimum cross section $A_R$ of the restrictor, in particular a minimum cross section of the orifice, may be either fixed or variable. Furthermore, a fluid connection between the first fluid port and the first pneumatic actuator may have a minimum cross section $A_4$. The ratio $A_R/A_4$ may be one of: smaller than $\frac{1}{10}$; smaller than $\frac{1}{50}$; smaller than $\frac{1}{100}$; smaller than $\frac{1}{200}$; and smaller than $\frac{1}{500}$.

For example, if the flow restrictor comprises an orifice having a variable minimum cross section, varying the minimum cross section of the first fluid restrictor when the first fluid port and/or the first pneumatic actuator is pressurized allows actively controlling an increase in a fluid pressure acting on the second pneumatic actuator, in particular relative to an increase in a fluid pressure acting on the first pneumatic actuator. Similarly, when the first fluid port and/or the first pneumatic actuator is vented or de-pressurized, varying the minimum cross section of the first fluid restrictor allows actively controlling a decrease in the fluid pressure acting on the second pneumatic actuator, in particular relative to the decrease in the fluid pressure acting on the first pneumatic actuator.

A fluid connection between the first fluid port and the first pneumatic actuator may have a minimum cross section $A_1$, and, when the movable member is in the open position, a fluid connection between the second fluid port and the first pneumatic actuator may have a minimum cross section $A_2$. $A_1$ may be larger than $A_2$, i.e. $A_1 > A_2$. When the movable member is in the open position and the first fluid port is vented, the fact that $A_1$ is larger than $A_2$ may delay a pressure drop at the second fluid port with respect to a pressure drop at the first fluid port and/or with respect to a pressure drop in the first fluid actuator. For example, when the second fluid port is connected to a pneumatic tire, the fact that $A_1$ is larger than $A_2$ may allow closing the valve by venting the first fluid port and/or by venting the first pneumatic actuator without causing a significant pressure drop in the tire.

In particular, the ratio $A_1/A_2$ may fulfill at least one of the following relations: $2 \leq A_1/A_2 \leq 10$; and $4 \leq A_1/A_2 \leq 8$. The minimum cross section $A_2$ of the fluid connection between the second fluid port and the first pneumatic actuator may be configured to be variable. For example, the minimum cross section $A_2$ may be configured to vary automatically based on a pressure difference between the second fluid port and the first pneumatic actuator. For instance, a mechanism including the variable minimum cross section $A_2$ may comprise an elastic member such as a spring or a membrane. The elastic member may be deformable based on the pressure difference between the second fluid port and the first pneumatic actuator, thereby varying the minimum cross section $A_2$ and a flow of fluid flowing between the second fluid port and the first pneumatic actuator through the minimum cross section $A_2$.

The valve assembly may further comprise a fluid reservoir, wherein the first fluid port is in fluid communication with the fluid reservoir via the flow restrictor, and wherein the fluid reservoir is in fluid communication with the second pneumatic actuator. For example, a volume $V_C$ of the fluid reservoir and a maximum displacement $V_2$ of the second pneumatic actuator may fulfill at least one of the following relations $V_C \geq 3 \cdot V_2$; $V_C \geq 5 \cdot V_2$; and $V_C \geq 10 \cdot V_2$. Additionally or alternatively, the volume $V_C$ of the fluid reservoir and a maximum displacement $V_1$ of the first pneumatic actuator may fulfill at least one of the following relations $V_C \geq 3 \cdot V_1$; $V_C \geq 5 \cdot V_1$; and $V_C \geq 10 \cdot V_1$. The minimum cross section $A_R$ of the flow restrictor and the volume $V_C$ of the fluid reservoir may fulfill the relation $10^{-7}$ mm$^{-1} \leq A_R/V_C \leq 10^{-1}$, preferably $10^{-6}$ mm$^{-1} \leq A_R/V_C \leq 10^{-5}$ mm$^{-1}$.

When the first fluid port and/or the first pneumatic actuator is pressurized, the additional fluid storage capacity provided by the fluid reservoir may further slow down the increase in the fluid pressure or the increase in the closing force acting on the second pneumatic actuator, in particular relative to the increase in the fluid pressure or the increase in the opening force acting on the first pneumatic actuator. Thus, when the first fluid port and/or the first pneumatic actuator is pressurized, the additional fluid storage capacity provided by the fluid reservoir may facilitate the opening of the valve assembly, i.e. the movement of the movable member from the closed position to the open position.

Similarly, when the first fluid port and/or the first pneumatic actuator is vented or de-pressurized, the additional amount of pressurized fluid stored in the additional storage capacity provided by the fluid reservoir may further slow down the decrease in the fluid pressure or in the closing force acting on the second pneumatic actuator, in particular relative to the decrease in the fluid pressure or in the opening force acting on the first pneumatic actuator. Thus, when the first fluid port and/or the first pneumatic actuator is vented or de-pressurized, a pressurized fluid stored in the additional fluid storage capacity provided by the fluid reservoir may facilitate the closing of the valve assembly, i.e. the movement of the movable member from the open position to the closed position.

The valve assembly may comprise a biasing member configured to bias the movable member toward the closed position. In particular, the biasing member may be configured to hold the movable member in the closed position in the absence of a net force exerted on the movable member by way of the pneumatic actuators. It is likewise conceivable that in other embodiments the biasing member is configured to bias the movable member toward the open position. In the latter case, the biasing member may be configured to hold the movable member in the open position in the absence of a net force exerted on the movable member by way of the pneumatic actuators. For example, the biasing member may comprise an elastic member such as a spring. The stiffness of the biasing member adds an additional parameter that may be tuned to calibrate the forces acting on the movable member.

The movable member may be movably disposed within a chamber. The chamber may comprise a first variable volume forming the first pneumatic actuator and a second variable volume forming the second pneumatic actuator. That is, the movable member may be configured such that pressurized fluid in the first variable volume forces or biases or additionally forces or additionally biases the movable member toward the open position, and the movable member may be configured such that pressurized fluid in the second variable volume forces or biases or additionally forces or additionally biases the movable member toward the closed position. The first fluid port and the second fluid port may be fluidly connectable in such a way that when the movable member is in the open position the first fluid port and the second fluid port are in fluid communication via the first variable volume.

The chamber comprising the first variable volume and the second variable volume may be delimited by a rigid chamber wall and the movable member movably disposed within the chamber may be a rigid member. The chamber and the movable member may further be configured such that a total volume of the chamber comprising the first variable volume and the second variable volume is independent of a position of the movable member relative to the chamber.

The movable member may be linearly movable within the chamber along an axis of movement. The first variable volume and the second variable volume may be formed on opposing sides of the movable member along the axis of movement. A first axial direction may be defined as pointing from the second variable volume toward the first variable volume along the axis of movement, and a second axial direction may be defined as pointing from the first variable volume toward the second variable volume along the axis of movement. The movable member may then be configured such that pressurized fluid in the first variable volume is configured to move the movable member in the second axial direction and that pressurized fluid in the second variable volume is configured to move the movable member in the first axial direction.

At least a portion of the movable member may be in sliding sealing contact with the chamber wall delimiting the chamber by way of sealing means. For example, the sealing means may include one or more sealing rings or the like. The sealing means may be mounted on the movable member and/or the sealing means may be mounted on or in the chamber wall. The sealing means may be arranged or mounted such that they divide the chamber into at least the first variable volume and the second variable volume. The sealing means may fluidly isolate the first variable volume from the second variable volume. Additionally or alternatively, the valve assembly may comprise sealing means such as a diaphragm, for example a fixed diaphragm, for fluidly isolating the first variable volume and the second variable volume from one another. The first variable volume may form the first pneumatic actuator, and the second variable volume may form the second pneumatic actuator.

The first variable volume and the second variable volume are variable in the sense that their volume may vary as the movable member moves between the closed position and the open position. For example, as the movable member moves from the closed position to the open position, the first variable volume forming the first pneumatic actuator may increase and the second variable volume forming the second pneumatic actuator may decrease. Conversely, as the movable member moves from the open position to the closed position, the second variable volume forming the second pneumatic actuator may increase and the first variable volume forming the first pneumatic actuator may decrease.

When the movable member is in the open position the first fluid port and the second fluid port may be in fluid communication via a fluid connection which bypasses the flow restrictor.

A tire inflation system comprising the proposed valve assembly may additionally include a source of pressurized fluid, such as a compressor, and a pneumatic tire. The source of pressurized fluid may be in fluid communication or in selective fluid communication with the first fluid port of the valve assembly for selectively pressurizing the first fluid port and/or the first pneumatic actuator. The second fluid port of the valve assembly may be in fluid communication with the pneumatic tire, for example for selectively pressurizing or for selectively de-pressurizing the pneumatic tire via the second fluid port when the movable member of the valve assembly is in the open position.

Typically, the tire inflation system additionally includes a vent providing fluid communication or selective fluid communication between the first fluid port of the valve assembly and the atmosphere or between the first fluid port of the valve assembly and a low pressure tank for selectively de-pressurizing the first fluid port and/or the first pneumatic actuator via the vent. The tire inflation system may further comprise a further flow restrictor/throttle. The further flow restrictor/throttle and the vent may be in fluid communication or in selective fluid communication with the first fluid port in such a way that the first fluid port may be selectively vented or de-pressurized via the further flow restrictor/throttle. This way, the first fluid port of the valve assembly may be vented at different rates. In particular, the further restrictor/throttle may have a variable minimum cross section for varying the rate at which the first fluid port of the valve assembly is vented.

The tire inflation system may further comprise a rotatable part such as a wheel or a wheel hub. The pneumatic tire and the valve assembly may be mounted on the rotatable part. The first fluid port and/or the first pneumatic actuator of the valve assembly may then be in fluid communication with the source of pressurized fluid by way of a rotary joint. The rotary joint is usually disposed between a stationary component and the rotatable part, wherein the rotatable part is typically rotatably mounted on the stationary component. The stationary component may comprise a spindle, for example.

When the movable member is in the open position, the pneumatic tire fluidly connected to the second fluid port may be either inflated or deflated via the valve assembly. For inflating the tire, the first fluid port may be pressurized so that the pressurized fluid applied to the first fluid port enters the tire via the second fluid port. For deflating the tire, the first fluid port and/or the first pneumatic actuator may be vented or de-pressurized, for example via the previously mentioned vent and via the further flow restrictor to prevent the movable member from moving to the closed position, until a fluid pressure at the first fluid port falls below the tire pressure. The tire may then be deflated via the open valve assembly.

Alternatively, deflating the tire may comprise the steps of opening the valve assembly by pressurizing the first pneumatic actuator via the first fluid port using a pressure pulse, wherein a maximum pressure of the pressure pulse and a time duration of the pressure pulse are chosen such that after the movable member has been moved to the open position and the first fluid port has been placed in fluid communication with the tire, a pneumatic pressure in the second pneumatic actuator is sufficiently low to prevent the movable member from moving to the closed position. When the movable member is in the open position, the first pneumatic actuator may then be vented via the first fluid port, until a fluid pressure at the first fluid port is below the tire pressure. The tire may then be deflated via the first fluid port.

It is important to note that the process of venting or de-pressurizing the first fluid port and/or the first pneumatic actuator for deflating or de-pressurizing the pneumatic tire has to be carried out at a slow enough rate to prevent the movable member from inadvertently moving to the closed position. As the first pneumatic actuator and the second pneumatic actuator are in fluid communication with the first fluid port, both the first pneumatic actuator and the second pneumatic actuator are de-pressurized as the first fluid port is vented. However, the second pneumatic actuator is in fluid communication with the first fluid port only via the flow restrictor which restricts the rate at which a fluid pressure in the second pneumatic actuator may drop. Thus, if the first fluid port is vented too fast, a closing force exerted on the movable member by way of a residual fluid pressure in the second pneumatic actuator (and possibly an additional closing force exerted on the movable member by way of a biasing member) may exceed an opening force exerted on the movable member by way of a fluid pressure in the first pneumatic actuator. Therefore, in order to hold the movable member in the open position during the process of deflating or de-pressurizing the pneumatic tire, the first fluid port must be vented slowly enough for the opening force to exceed the closing force.

BRIEF DESCRIPTION OF THE DRAWINGS

An embodiment of the presently proposed valve assembly, tire inflation system and methods of operation are described in the following detailed description and are depicted in the accompanying drawing in which.

DETAILED DESCRIPTION

Figure 1:
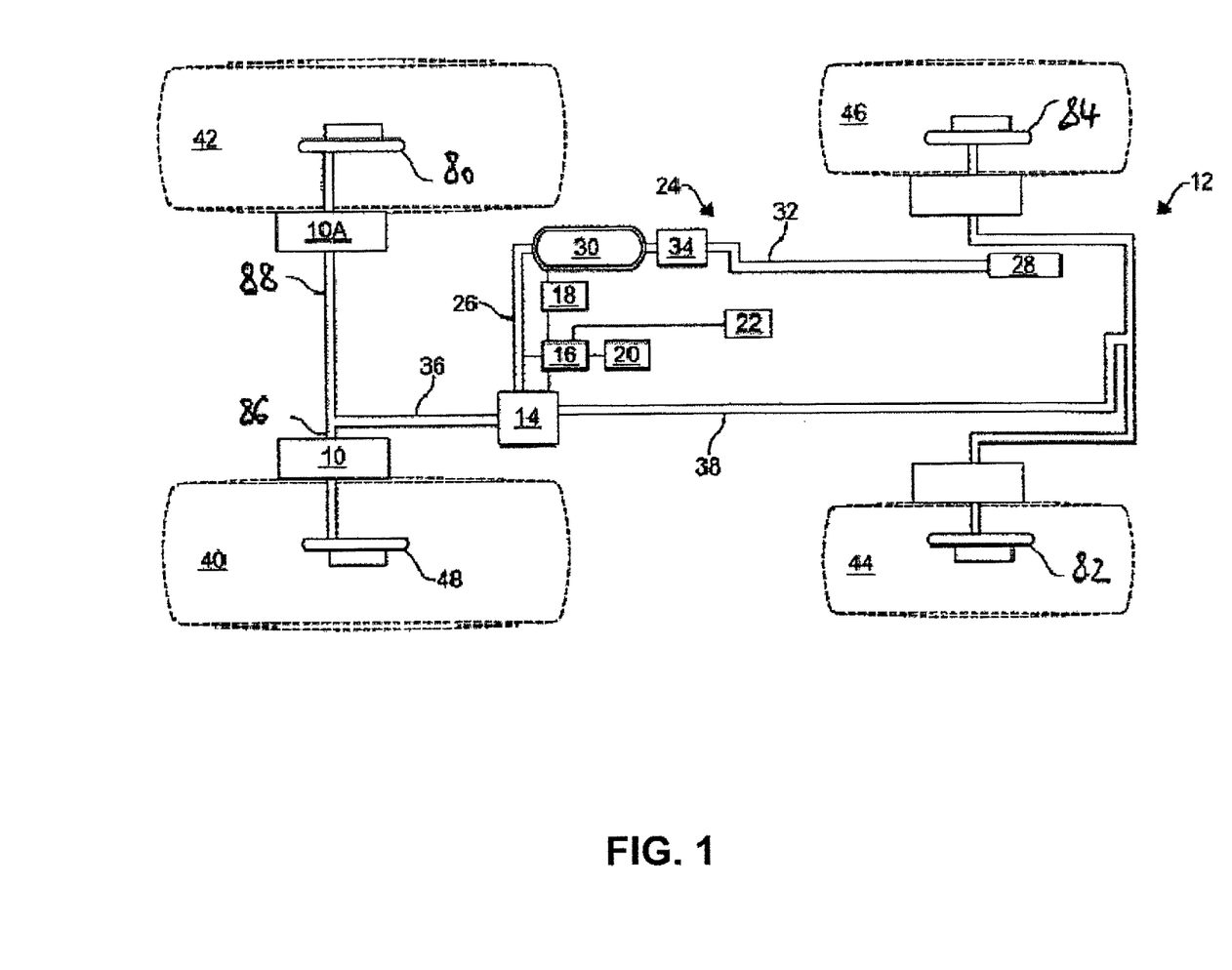
FIG. 1 shows an embodiment of a tire inflation system in accordance with the present invention.

A schematic illustration of an embodiment of the tire inflation system 12 is illustrated in FIG. 1. The tire inflation system 12 comprises a pneumatic control portion 14. The pneumatic control portion 14 comprises a pressure sensor and a temperature sensor (not depicted) for measuring the pressure and the temperature of air. Preferably, the pneumatic control portion 14 also comprises a plurality of valve assemblies (not depicted) which are of the solenoid variety, and one or more first fluid conduits for controlling the flow of and directing air through the system 12. The pneumatic control portion 14 may further comprise a vent for selectively placing the fluid control circuits 36, 38 in fluid communication with the atmosphere. Furthermore, the pneumatic control portion 14 may comprise a variable flow restrictor for controlling a flow of air through the previously mentioned vent.

The tire inflation system 12 also comprises an electronic control portion 16. The electronic control portion 16 may receive input signals from the pressure sensor and/or from the temperature sensor, a power supply (not depicted) and one or more additional sensors (not depicted) such as, for example, a pressure switch 18 and a speed sensor 20. The electronic control portion 16 may also receive input signals from an operator control device 22. The electronic control portion 16 may include a microprocessor (not depicted) operating under the control of a set of programming instructions, which may also be referred to as software. The electronic control portion 16 may include a memory (not depicted) in which programming instructions are stored. The memory can also store identification codes, tire pressure records and/or user inputs over a period of time.

The electronic control portion 16 outputs signals to the pneumatic control portion 14 to, for example, open or close the valve assemblies. The electronic control portion 16 may also output signals to a display device (not depicted). The display device may be included as a part of the operator control device 22 or a freestanding device.

The pneumatic control portion 14 and the electronic control portion 16 each selectively communicate with an air supply 24 via an air supply circuit 26. The pressure sensor measures the pressure of the air supply 24 via the air supply circuit 26. The air supply 24 may be utilized to check the tire pressure and, if needed, increase and/or decrease the tire pressure.

The air supply 24 is preferably provided by an air compressor 28 attached to the vehicle. Preferably, the air supply 24 also comprises an air tank 30. The compressor 28 is in fluid communication with the air tank 30 via a supply conduit 32. The air compressor 28 supplies pressurized air to the air tank 30 for storage therein. Pressurized air from the air supply 24 is provided to the air supply circuit 26 via the air tank 30. A drier 34 is provided for removing water from the air supply 24. A filter (not depicted) may also be interposed in the air supply circuit 26 or the supply conduit 32.

The pneumatic control portion 14 is also selectively in fluid communication with one or more fluid control circuits 36, 38. Each fluid control circuit 36, 38 is utilized to provide fluid communication between the pneumatic control portion 14 and one or more tires 40, 42, 44, 46. Fluid communication between the pneumatic control portion 14 and fluid control circuits 36, 38 is preferably controlled by opening or closing a valve (not depicted).

Each tire 40, 42, 44, 46 contains air at a certain pressure which will hereinafter be referred to herein as tire pressure. Preferably, the tire pressure is equal to a target tire pressure. The target tire pressure can be selected to be a desired pressure. After the target tire pressure is selected, it is programmed into the electronic control portion 16. If it is determined that the tire pressure is less than the target tire pressure, the tire pressure can be increased. If it is determined that the tire pressure is greater than the target tire pressure, the tire pressure can be decreased. The tire inflation system 12 will be described below with reference to the tire pressure of one tire 40. However, the tire inflation system 12 may at certain times be in fluid communication with a plurality of tires 40, 42 in order to perform the aforementioned functions.

A wheel valve assembly 48 is provided at an end of the fluid control circuit 36 to control the flow of pressurized air into and out of the tire 40. Preferably, a wheel valve assembly 48, 80, 82, 84 is provided for each tire 40, 42, 44, 46 to control the flow of pressurized air into and out of the tire 40, 42, 44, 46. The fluid control circuit 36 comprises the rotary joint assembly 10. The fluid control circuit 36 will be described with reference to one assembly 10. However, as illustrated in FIG. 1, the fluid control circuit 36 may comprise one or more rotary joint assemblies 10, 10A. For example, a first rotary joint assembly 10 associated with a tire 40 on a drive axle of the vehicle could be provided and a second rotary joint assembly 10A associated with another tire 42 on the drive axle could be provided. Preferably, the first rotary joint assembly 10 and the second rotary joint assembly 10A are similarly configured. The fluid control circuit 36 may also comprise one or more fluid conduits 86,

88. The rotary joint assembly 10 is not limited to use with a drive axle. Thus, the rotary joint assembly 10 is suitable for use with, for example, a steer axle. The rotary joint assembly 10 is also suitable for use with a steerable axle. The steerable axle may be driven or non-driven.

Figure 2A:
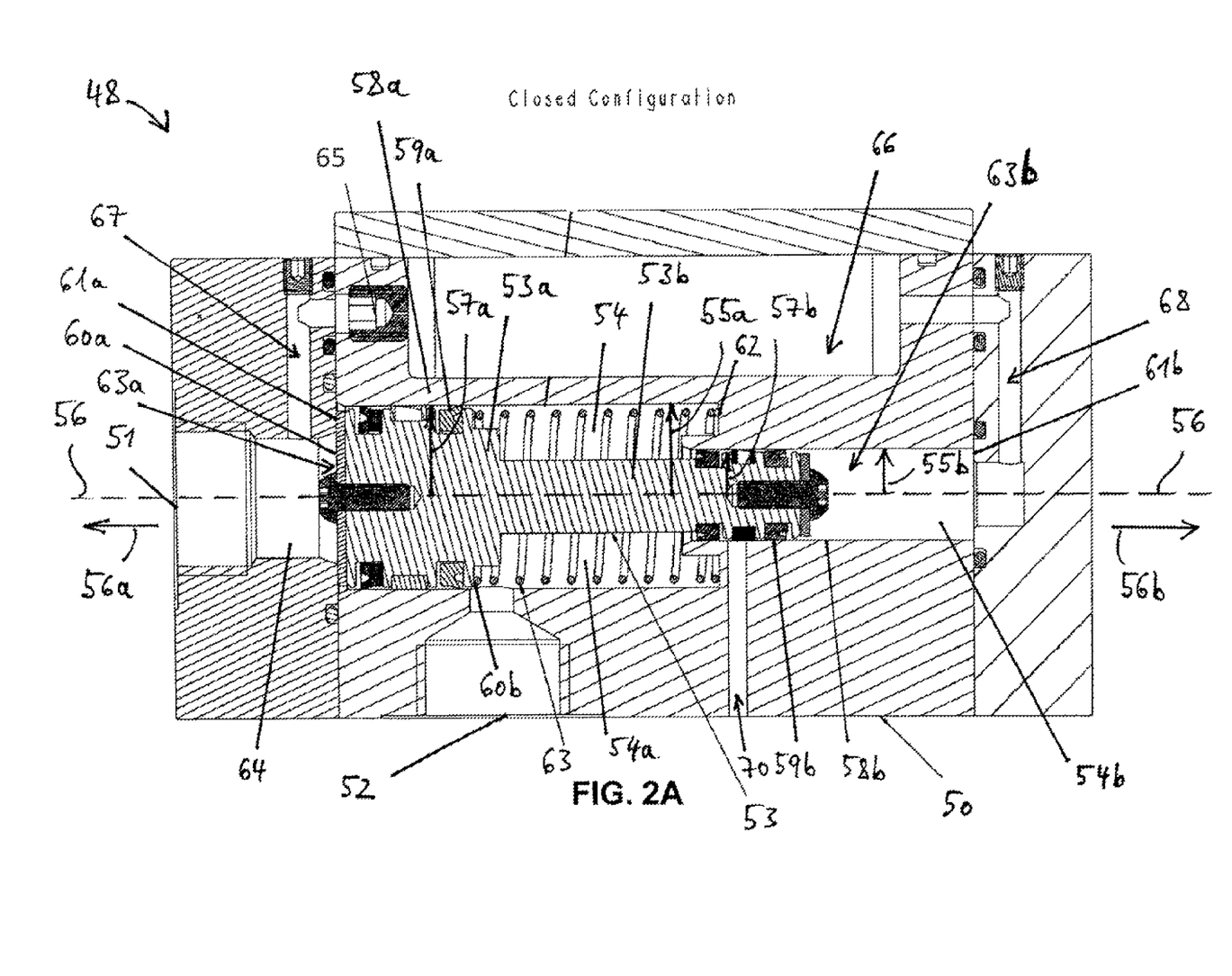
FIG. 2A shows a first embodiment of a valve assembly in accordance with the present invention, wherein a valve spool of the valve assembly is in a closed position.
Figure 2B:
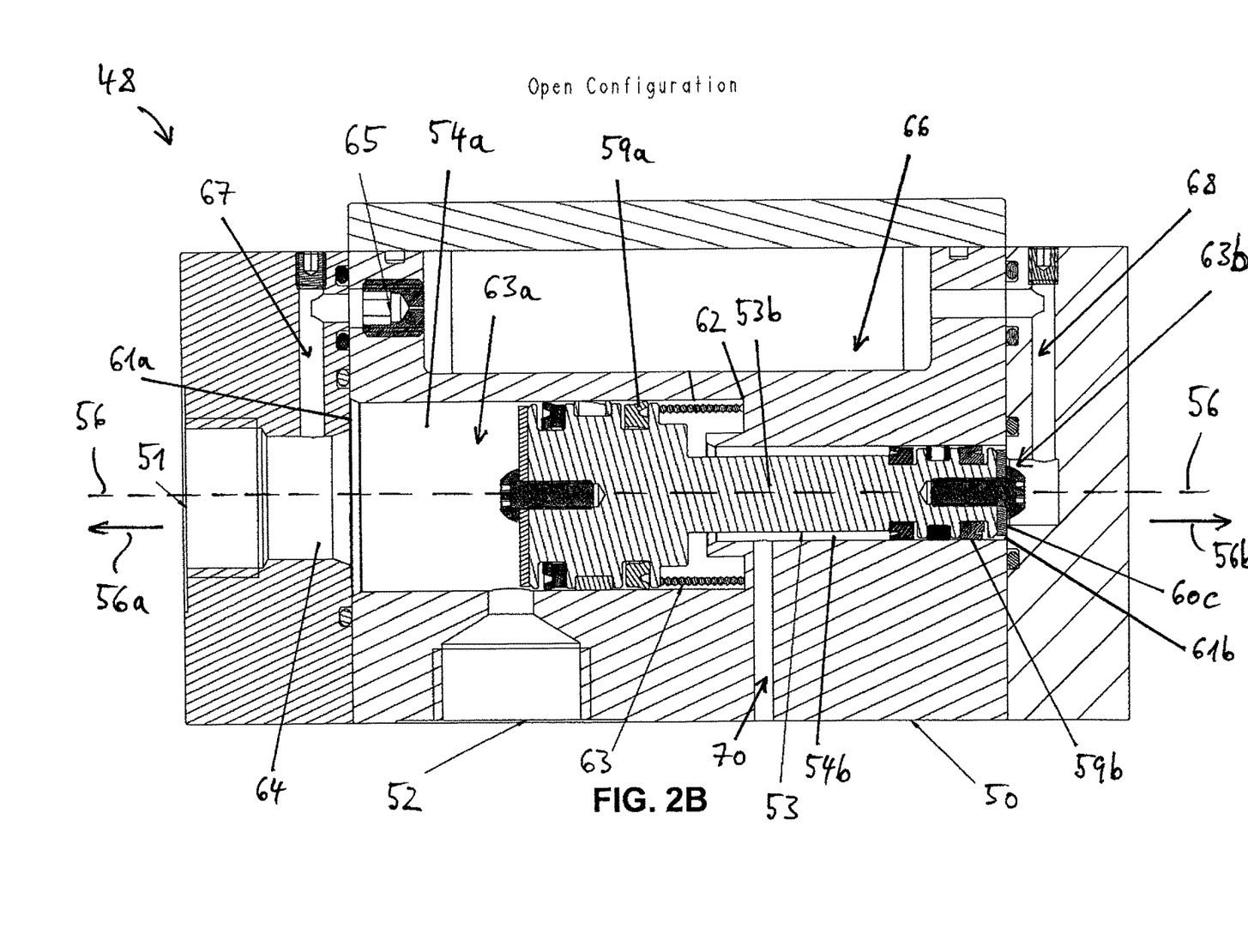
FIG. 2B shows the valve assembly of FIG. 2A, wherein the valve spool is in an open position.

A detailed view of the valve assembly 48 is illustrated in FIGS. 2A and 2B. FIG. 2A show the valve assembly 48 in a closed configuration. In the closed configuration the valve assembly 48 blocks the passage of fluid through the valve assembly 48. FIG. 2B show the valve assembly 48 in an open configuration. In the open configuration the valve assembly 48 allows the passage of fluid through the valve assembly 48. Here and in the following recurring features are designated with the same reference numerals.

The valve assembly 48 comprises a valve body 50 which may be made of metal, for example. The valve body 50 encloses a chamber 54 comprised of a first section 54*a* and a second section 54*b*. In the embodiment shown in FIGS. 2A and 2B both the first section 54*a* and the second section 54*b* of the chamber 54 have a cylindrical shape and are concentrically arranged with respect to an axis 56 defining an axial direction. In other embodiments not explicitly depicted here at least one of the first section 54*a* and the second section 54*b* of the chamber 54 may have a rectangular shape, for example. The first section 54*a* has a radius 55*a*, and the second section 54*b* has a radius 55*b*, wherein the radius 55*a* of the first section 54*a* is larger than the radius 55*b* of the second section 55*b*. The valve body 50 comprises a first fluid port 51 and a second fluid port 52. The fluid ports 51, 52 are configured as separate openings in the valve body 50 and are in fluid communication with the first section 54*a* of the chamber 54. Specifically, the first fluid port 51 is in fluid communication with the first section 54*a* of the chamber 54 via a fluid connection 64 formed by a bore in the valve body 50. Moreover, the first fluid port 51 is in fluid communication with the air compressor 28 via the rotary joint 10 and the pneumatic control portion 14, and the second fluid port 52 is in fluid communication with the tire 40 (see FIG. 1).

A valve spool 53 is movably disposed within the chamber 54. The valve spool 53 has a first portion 53*a* and a second portion 53*b*. The first portion 53*a* and the second portion 53*b* may be integrally formed. Here, the first portion 53*a* and the second portion 53*b* are formed at a first end and at a second end of the valve spool 53, respectively. The first portion 53*a* of the spool 53 is received within the first section 54*a* of the chamber 54, and the second portion 53*b* of the spool 53 is at least partially received within the second section 54*b* of the chamber 54. Both the first portion 53*a* and the second portion 53*b* of the spool 53 have a cylindrical or essentially cylindrical shape and are arranged concentrically with respect to a common axis which coincides with the axis 56. A maximum radius 57*a* of the first portion 53*a* of the spool 53 is larger than a maximum radius 57*b* of the second portion 53*b* of the spool 53. The maximum radius 57*a* of the first portion 53*a* of the spool 53 essentially corresponds with the radius 55*a* of the first section 54*a* of the chamber 54, and the maximum radius 57*b* of the second portion 53*b* of the spool 53 essentially corresponds with the radius 55*b* of the second section 54*b* of the chamber 54. The first portion 53*a* of the valve spool 53 is in sliding sealing contact with a chamber wall 58*a* delimiting the first section 54*a* of the chamber 54 by way of first sealing means 59*a*, and the second portion 53*b* of the valve spool 53 is in sliding sealing contact with a chamber wall 58*b* delimiting the second section 54*b* of the chamber 54 by way of second sealing means 59*b*.

The valve spool 53 is configured to be linearly moved between a closed position, as shown in FIG. 2A, and an open position, as shown in FIG. 2B. In the closed position of the valve spool 53 depicted in FIG. 2A, a first face 60*a* of the first portion 53*a* of the valve spool 53 contacts a first mechanical stop 61*a*. The first face 60*a* may comprise a damping element. The first mechanical stop 61*a* limits the movement of the valve spool in a first axial direction 56*a* pointing towards the left in FIGS. 2A and 2B. Here, the first mechanical stop 61*a* is formed by a protrusion of the valve body 50. When the valve spool 53 is in the closed position, the first face 60*a* of the first portion 53*a* of the valve spool 53 closes the first section 54*a* of the chamber 54 toward the first fluid port 51, thereby fluidly isolating the second fluid port 52 from the first fluid port 51 and blocking a flow of fluid between the first fluid port 51 and the second fluid port 52.

The valve assembly 48 further comprises a spring 63 biasing the valve spool 53 toward the first axial direction 56*a* and toward the closed position depicted in FIG. 2A. The spring 63 is disposed within the first section 54*a* of the chamber 54. In particular, the spring 63 is disposed between a second face 60*b* of the first portion 53*a* averted from the first face 60*a* of the first portion 53*a*, and a portion 62 of the valve body 50 delimiting the first section 54*a* of the chamber 54 in a second axial direction 56*b* opposite the first axial direction 56*a* and pointing towards the right in FIGS. 2A and 2B.

In the open position of the valve spool 53 depicted in FIG. 2B, a face 60*c* of the second portion 53*b* of the valve spool 53 contacts a second mechanical stop 61*b*. The face 60*c* may comprise a damping element. The second mechanical stop 61*b* limits the movement of the valve spool 53 in the second axial direction 56*b*. Here, the second mechanical stop 61*b* is formed by a protrusion of the valve body 50. When the valve spool 53 is in the open position, the first portion 53*a* of the valve spool 53 opens the first section 54*a* of the chamber 54 toward the first fluid port 51 and toward the second fluid port 52. That is, when the valve spool 53 is in the open position, fluid communication between the first fluid port 51 and the second fluid port 52 is established via the first section 54*a* of the chamber 54 so that fluid may flow between the first fluid port 51 and the second fluid port 52 via the first section 54*a* of the chamber 54.

The first sealing means 59*a* and the second sealing means 59*b* divide the chamber 54 into a first variable volume 63*a* and a second variable volume 63*b*. The variable volumes 63*a*, 63*b* are variable in the sense that they vary as the spool 53 is moved between the closed position depicted in FIG. 2A, and the closed position depicted in FIG. 2B.

The first variable volume 63*a* extends between the first sealing means 59*a* and the first mechanical stop 61*a* delimiting the first section 54*a* of the chamber 54 in the first axial direction 56*a*. The first variable volume 63*a* has its minimum extension when the spool 53 is in the closed position depicted in FIG. 2A. Conversely, the first variable volume 63*a* has its maximum extension when the spool 53 is in the open position depicted in FIG. 2B. In other words, the first variable volume 63*a* increases as the spool 53 is moved from the closed position toward the open position, and the first variable volume 63*a* decreases as the spool 53 is moved from the open position toward the closed position. The first variable volume 63*a* forms a first pneumatic actuator configured to bias the spool 53 toward the open position. That is, pressurized fluid in the first variable volume 63*a* or pressurized fluid entering the first variable volume 63*a* via the first fluid port 51 exerts an opening force $F_{open}$ on the first face 60a of the first portion 53a of the spool 53 and biases the spool 53 in the second axial direction 56b toward the open position. A maximum displacement $V_1$ of the first pneumatic actuator 63a is given by the volume swept by the first face 60a of the first portion 53a of the spool 53 as the spool 53 moves from the closed position depicted in FIG. 2A to the open position depicted in FIG. 2B.

The second variable volume 63b extends between the second sealing means 59b and the second mechanical stop 61b delimiting the second section 54b of the chamber 54 in the second axial direction 56b. The second variable volume 63b has its maximum extension when the spool 53 is in the closed position depicted in FIG. 2A. Conversely, the second variable volume 63b has its minimum extension when the spool 53 is in the open position depicted in FIG. 2B. In other words, the second variable volume 63b decreases as the spool 53 is moved from the closed position to the open position, and the second variable volume 63b increases as the spool 53 is moved from the open position to the closed position. The second variable volume 63b forms a second pneumatic actuator configured to bias the spool 53 toward the closed position. That is, pressurized fluid in the second variable volume 63b or pressurized fluid entering the second variable volume 63b exerts a closing force $F_{close}$ on the face 60c of the second portion 53b of the spool 53 and biases the spool 53 in the first axial direction 56a and toward the closed position. A maximum displacement $V_2$ of the second pneumatic actuator 63b is given by the volume swept by the face 60c of the second portion 53b of the spool 53 as the spool 53 moves from the closed position depicted in FIG. 2A to the open position depicted in FIG. 2B. For example, the maximum displacement $V_1$ of the first pneumatic actuator 63a and the maximum displacement $V_2$ of the second pneumatic actuator 63b may fulfill the relation $2 \leq V_1/V_2 \leq 5$.

The first fluid port 51 and the first pneumatic actuator 63a are in fluid communication with the second pneumatic actuator 63b via the fluid connection 64, a fluid line 67, a flow restrictor 65, a fluid reservoir 66, and a fluid line 68. In the embodiment of the valve assembly 48 depicted in FIGS. 2A and 2B the fluid lines 67, 68 (and 70) are configured as bores in the valve body 50. In other words, the first fluid port 51 and the first pneumatic actuator 63a are in fluid communication with the fluid reservoir 66 via the flow restrictor 65, and the fluid reservoir 66 is in fluid communication with the second pneumatic actuator 63b.

As explained above, the spring 63 exerts a continual closing force $F_{spring}$ on the valve spool 53. Like the closing force $F_{close}$ the spring force $F_{spring}$ points in the first axial direction 56a, i.e. to the left in FIGS. 2A and 2B. Therefore, in order to hold the valve spool 53 in the open position, the opening force $F_{open}$ exerted on the valve spool 53 by way of the first pneumatic actuator 63a must be equal to or larger than the sum of the closing force $F_{spring}$ exerted on the valve spool 53 by way of the spring 63 and the closing force $F_{close}$ exerted on the valve spool 53 by way of the second pneumatic actuator 63b: $F_{open} \geq F_{close} + F_{spring}$. On the other hand, in order to move the valve spool 53 from the closed position to the open position, the opening force $F_{open}$ exerted on the valve spool 53 by way of the first pneumatic actuator 63a must be larger than the sum of the spring force $F_{spring}$, the closing force $F_{close}$, and possibly a frictional force $F_{friction}$: $F_{open} > F_{close} + F_{spring} + F_{friction}$. The frictional force $F_{friction}$ may be caused by friction between the sealing means 59a, 59b and the chamber wall 58a, 58b, for example. Typically, the spring force $F_{spring}$ is a function of the deflection of the spring 63. For example, $F_{spring}$ may be larger in the open position when the spring 63 is fully compressed than in the closed position.

The opening force $F_{open}$ exerted on the valve spool 53 by way of pressurized fluid in the first pneumatic actuator 63a is given by $F_{open} = p_1 \cdot A_{spool,1}$, wherein $p_1$ is the fluid pressure at the first fluid port 51 and/or in the first pneumatic actuator 63a and acting on the first face 60a of the first portion 53a of the valve spool 53, and wherein $A_{spool,1}$ is the area of the first face 60a of the first portion 53a of the spool 53 on which pressurized fluid in the first pneumatic actuator 63a is acting to bias the spool 53 toward the open position. Similarly, the closing force $F_{close}$ exerted on the valve spool 53 by way of pressurized fluid in the second pneumatic actuator 63b is given by $F_{close} = p_2 \cdot A_{spool,2}$, wherein $p_2$ is the fluid pressure in the fluid reservoir 66 and/or in the second pneumatic actuator 63b and acting on the face 60c of the second portion 53b of the valve spool 53, and wherein $A_{spool,2}$ is the area of the face 60c n which pressurized fluid in the second pneumatic actuator 63b is acting to bias the spool 53 toward the closed position. Thus, a person of ordinary skill readily understands that the pressure values $p_1$ and $p_2$ and the sizes of the areas $A_{spool,1}$ and $A_{spool,2}$ determine the magnitudes of the forces $F_{open}$ and $F_{close}$, respectively.

As shown in FIGS. 2A and 2B, $A_{spool,1}$ may be larger than $A_{spool,2}$, i.e. $A_{spool,1} > A_{spool,2}$. For example, $A_{spool,1} \geq 2 \cdot A_{spool,2}$, $A_{spool,1} \geq 3 \cdot A_{spool,2}$, or $A_{spool,1} \geq 4 \cdot A_{spool,2}$. This may facilitate controlling the opening force $F_{open} = p_1 \cdot A_{spool,1}$ acting on the spool 53. For example, due to the flow restrictor 65 arranged between the first fluid port 51 and the second pneumatic actuator 63b, the fluid pressure at the first fluid port 51 and/or in the first pneumatic actuator 63a may be raised or lowered faster than the fluid pressure in the second pneumatic actuator 63b.

The flow restrictor 65 is configured as an orifice having a fixed minimum cross section $A_R$. It is understood that the flow restrictor 65 may likewise have a variable minimum cross section $A_R$. The fluid connection 64 between the first fluid port 51 and the first pneumatic actuator 63a, on the other hand, has a minimum cross section $A_A$. The minimum cross section $A_R$ of the flow restrictor 65 is smaller than the minimum cross section $A_A$ of the fluid connection 64 between the first fluid port 51 and the first pneumatic actuator 63a. For example, in the embodiment depicted in FIGS. 2A and 2B $A_A = 75$ mm$^2$ and $A_R = 0.75$ mm$^2$. In other words, $A_A$ and $A_R$ may fulfill the relation $A_R/A_A \leq 1/100$.

To move the valve spool 53 from the closed position depicted in FIG. 2A to the open position depicted in FIG. 2B, the first fluid port 51 and/or the first pneumatic actuator 63a may be pressurized. The flow restrictor 65 then restricts a flow of pressurized fluid from the first fluid port 51 and/or from the first pneumatic actuator 63a to the second pneumatic actuator 63b relative to a flow of pressurized fluid from the first fluid port 51 to the first pneumatic actuator 63a. Thereby, an increase in the closing force $F_{close}$ biasing the valve spool 53 toward the closed position is delayed relative to an increase in the opening force $F_{open}$ biasing the valve spool 53 toward the open position. Or, in other words, the opening force $F_{open}$ is made to increase at a faster rate than the closing force $F_{close}$. Once the opening force $F_{open}$ exerted on the valve spool 53 by way of pressurized fluid in the first pneumatic actuator 63a exceeds the sum $F_{spring} + F_{close} + F_{friction}$ of the spring force $F_{spring}$, the closing force $F_{close}$ exerted on the valve spool 53 by way of pressurized fluid in the second pneumatic actuator 63b, and the frictional force $F_{friction}$, the valve spool 53 is moved to the open position.

As the first fluid port 51 and/or the first pneumatic actuator 63a is pressurized, some pressurized fluid may enter the fluid reservoir 66 and the fluid line 68 via the flow restrictor 65 and may increase the fluid pressure in the fluid reservoir 66, in the fluid line 68, and/or in the second pneumatic actuator 63b.

Once the valve spool 53 is in the open position depicted in FIG. 2B, the tire 40 may be either inflated or deflated via the valve assembly 48. For example, for inflating the tire 40, the air supply 24 may pressurize the tire 40 via the air supply circuit 26, the fluid control circuit 36, the rotary joint 10 and the open valve assembly 48. For deflating the tire 40, the first pneumatic actuator 63a may be gradually vented via the first fluid port 51, the fluid control circuit 36, and the pneumatic control portion 14 (FIG. 1) until the fluid pressure at the first fluid port 51 and/or in the first pneumatic actuator 63a falls below the tire pressure. When the fluid pressure at the first fluid port 51a and/or in the first pneumatic actuator 63a has fallen below the tire pressure, the tire 40 may be deflated via the open valve assembly 48, the fluid control circuit 36, and the pneumatic control portion 14. As explained above, care must be taken during these processes that the first fluid port 51 and/or the first pneumatic actuator 63a are vented slowly enough so that the opening force $F_{open}$ does not decrease faster than the sum of the closing force $F_{close}$ and the spring force $F_{spring}$, which could cause an unwanted closing of the valve assembly 48. The rate at which the first fluid port 51 and/or the first pneumatic actuator 63a are vented may be controlled using the above-described flow restrictor included in the pneumatic control portion 14, for example.

To move the valve spool 53 from the open position depicted in FIG. 2B to the closed position depicted in FIG. 2A, the first pneumatic actuator 63a may be abruptly de-pressurized. In this configuration, the flow restrictor 65 restricts the venting of fluid from the fluid reservoir 66 and/or from the second pneumatic actuator 63b relative to the venting of fluid from the first pneumatic actuator 63a. Or in other words, the flow restrictor 65 delays a decrease in the closing force $F_{close}$ biasing the valve spool 53 toward the closed position relative to a decrease in the opening force $F_{open}$ biasing the valve spool 53 toward the open position. Once the sum of the opening force $F_{open}$ exerted on the valve spool 53 by way of pressurized fluid in the first pneumatic actuator 63a and a possible frictional force $F_{friction}$, i.e. $F_{open}+F_{friction}$, falls below the sum $F_{spring}+F_{close}$ of the spring force $F_{spring}$ and the closing force $F_{close}$ exerted on the valve spool 53 by way of pressurized fluid in the second pneumatic actuator 63b, the valve spool 53 is moved to the closed position.

The invention claimed is:

1. A pneumatically controllable valve assembly for use in a tire inflation system, the valve assembly comprising:
    a first fluid port;
    a second fluid port;
    a movable member moved between an open position and a closed position, the first fluid port is in fluid communication with the second fluid port in the open position, and the first fluid port is fluidly isolated from the second fluid port in the closed position;
    a first pneumatic actuator in fluid communication with the first fluid port, the first pneumatic actuator formed by a first volume acting on a first face of the movable member to selectively bias the movable member toward the open position;
    a second pneumatic actuator in fluid communication with the first fluid port, the second pneumatic actuator formed by a second volume acting on a second face of the movable member to selectively bias the movable member toward the closed position; and
    a fluid line forming a branch from a fluid connection to the first pneumatic actuator to the second pneumatic actuator, the fluid line comprising a flow restrictor which restricts flow to the second face of the movable member creating a fluid reservoir between the flow restrictor and second face of the movable member, the fluid reservoir maintaining a higher pressure at the second face than at the first face of the movable member when a supply pressure is reduced to provide force to move the movable member to the closed position.

2. The valve assembly according to claim 1, wherein the movable member is movably disposed within a chamber, the chamber comprising a first variable volume forming the first pneumatic actuator, and the chamber comprising a second variable volume forming the second pneumatic actuator.

3. The valve assembly according to claim 2, wherein when the movable member is in the open position the first fluid port and the second fluid port are in fluid communication via the first variable volume.

4. The valve assembly according to claim 2, wherein the chamber comprising the first variable volume and the second variable volume is delimited by a rigid chamber wall and the movable member movably disposed within the chamber is a rigid member such that a total volume of the chamber comprising the first variable volume and the second variable volume is independent of a position of the movable member relative to the chamber.

5. The valve assembly according to claim 2, wherein the movable member is linearly movable within the chamber along an axis of movement and the first variable volume and the second variable volume are formed on opposing sides of the movable member along the axis of movement, a first axial direction pointing from the second variable volume toward the first variable volume along the axis of movement and a second axial direction pointing from the first variable volume toward the second variable volume along the axis of movement, wherein the movable member is configured such that pressurized fluid in the first variable volume is configured to move the movable member in the second axial direction and that pressurized fluid in the second variable volume is configured to move the movable member in the first axial direction.

6. The valve assembly according to claim 2, wherein the chamber is delimited by a chamber wall, wherein at least a portion of the movable member is in sliding sealing contact with the chamber wall by way of sealing means, the sealing means dividing the chamber into the first variable volume forming the first pneumatic actuator and into the second variable volume forming the second pneumatic actuator, the sealing means fluidly isolating the first variable volume from the second variable volume, such that pressurized fluid in the first variable volume is configured to bias the movable member toward the open position and such that pressurized fluid in the second variable volume is configured to bias the movable member toward the closed position.

7. The valve assembly according to claim 1, wherein when the movable member is in the open position the first fluid port and the second fluid port are in fluid communication via a fluid connection which bypasses the flow restrictor.

8. The valve assembly according to claim 1, wherein the flow restrictor has a variable minimum cross section.

9. The valve assembly according to claim 1, wherein the flow restrictor has a fixed minimum cross section or an air-permeable porous medium disposed in a fluid conduit fluidly connecting the first fluid port with the second pneumatic actuator, the air-permeable porous medium thereby reducing an effective minimum cross section of said fluid conduit.

10. The valve assembly according to claim 1, wherein the flow restrictor comprises an orifice having a minimum cross section $A_R$, wherein a fluid connection between the first fluid port and the first pneumatic actuator has a minimum cross section $A_1$, and wherein the ratio $A_R/A_1$ is one of: smaller than 1/10; smaller than 1/50; smaller than 1/100; smaller than 1/200; and smaller than 1/500.

11. The valve assembly according to claim 1, wherein a fluid connection between the second fluid port and the first pneumatic actuator has a variable minimum cross section.

12. The valve assembly according to claim 1, further comprising an elastic biasing member configured to bias the movable member toward the closed position.

13. A tire inflation system, comprising:
the valve assembly of claim 1;
a source of pressurized fluid; and
a pneumatic tire;
wherein the first fluid port of the valve assembly is in fluid communication or selectively in fluid communication with the source of pressurized fluid;
wherein the first fluid port is selectively in fluid communication with the atmosphere or with a low pressure reservoir for selectively venting the first fluid port; and
wherein the second fluid port of the valve assembly is in fluid communication with the pneumatic tire for selectively pressuring or de-pressurizing the pneumatic tire by way of the second fluid port when the valve assembly is in the open position.

14. The tire inflation system according to claim 13, further comprising a rotatable part, wherein the pneumatic tire and the valve assembly are mounted on the rotatable part, and wherein the first fluid port of the valve assembly is in fluid communication with the source of pressurized fluid by way of a rotary joint.

15. A method of inflating the pneumatic tire of the tire inflation system according to claim 13, the method comprising the steps of:
opening the valve assembly by pressurizing the first pneumatic actuator via the first fluid port, such that pressurized fluid in the first pneumatic actuator moves the movable member to the open position; and
pressurizing the pneumatic tire via the open valve assembly by pressurizing the first fluid port.

16. A method of deflating the pneumatic tire of the tire inflation system of claim 13, the method comprising the steps of:
opening the valve assembly by pressurizing the first pneumatic actuator via the first fluid port, such that pressurized fluid in the first pneumatic actuator moves the movable member to the open position;
when the movable member is in the open position, venting the first pneumatic actuator via the first fluid port and via a further flow restrictor to prevent the movable member from moving to the closed position, until a fluid pressure at the first fluid port is below the tire pressure; and
deflating the pneumatic tire via the first fluid port.

17. A method of deflating the pneumatic tire of the tire inflation system according to claim 13, the method comprising the steps of:
opening the valve assembly by pressurizing the first pneumatic actuator via the first fluid port by using a pressure pulse, such that pressurized fluid in the first pneumatic actuator moves the movable member to the open position;
when the movable member is in the open position, venting the first pneumatic actuator via the first fluid port, until a fluid pressure at the first fluid port is below the tire pressure;
controlling the rate of venting to maintain a force of the first pneumatic actuator at the first face greater than a force of the second pneumatic actuator at the second and maintain the movable member in the open position; and
deflating the pneumatic tire via the first fluid port.

18. The valve assembly of claim 1, wherein the first face of the movable member is larger than the second face.

19. A method of operating a valve assembly, the method comprising the steps of:
opening the valve assembly by pressurizing a first pneumatic actuator via a first fluid port, such that pressurized fluid in the first pneumatic actuator moves a movable member to the open position and connects the first fluid port to a second port, the first pneumatic actuator formed by a first volume acting on a first face of the movable member;
providing pressure to the first fluid port when the valve assembly is open to flow fluid in a first direction;
venting pressure at the first fluid port when the valve assembly is open to flow fluid in a second direction, and controlling fluid flow to maintain greater force generated by the first pneumatic actuator on the first face than force generated by a second pneumatic actuator on a second face of the movable member to maintain the valve assembly in an open position, the second pneumatic actuator in fluid communication with the first fluid port, the second pneumatic actuator formed by a second volume acting on the second face of the movable member to selectively bias the movable member toward the closed position;
restricting the flow between the first fluid port and the second pneumatic actuator via a flow restrictor such that a change in pressure at the second pneumatic actuator is delayed relative to a change in pressure at the first pneumatic actuator; and
closing the valve by reducing the pressure at the first port such that the force generated by the second pneumatic actuator delayed by the flow restrictor is greater than the force generated by the first pneumatic actuator.

20. The method of claim 19, wherein a pressure drop to close the valve is greater than a pressure drop to flow fluid in a second direction.

* * * * *